United States Patent
Morita et al.

(10) Patent No.: US 6,745,199 B2
(45) Date of Patent: Jun. 1, 2004

(54) INFORMATION PROCESSING APPARATUS AND INFORMATION PROCESSING METHOD, AND PROGRAM STORING MEDIUM

(75) Inventors: Toshihiro Morita, Kanagawa (JP); Mikiko Sakurai, Kanagawa (JP)

(73) Assignee: Sony Corporation, Tokyo (JP)

( * ) Notice: Subject to any disclaimer, the term of this patent is extended or adjusted under 35 U.S.C. 154(b) by 133 days.

(21) Appl. No.: 09/975,850

(22) Filed: Oct. 11, 2001

(65) Prior Publication Data

US 2002/0073108 A1 Jun. 13, 2002

(30) Foreign Application Priority Data

Oct. 12, 2000 (JP) ........................................ 2000-311798

(51) Int. Cl.$^7$ .............................................. G06F 17/30
(52) U.S. Cl. ........................................... 707/102; 707/4
(58) Field of Search .............................. 707/200, 3, 4, 707/9, 10, 102; 705/14; 709/223; 713/201; 717/101, 121, 151

(56) References Cited

U.S. PATENT DOCUMENTS 6,496,802 B1 * 12/2002 van Zoest et al. ............ 705/14
6,505,213 B1 * 1/2003 Kamada et al. ............ 707/200

* cited by examiner

Primary Examiner—Diane D. Mizrahi
Assistant Examiner—Apu M Mofiz
(74) Attorney, Agent, or Firm—Frommer Lawrence & Haug LLP; William S. Frommer; Bruno Polito

(57) ABSTRACT

A tree display is made in a tree display area of a play list display area as of the contents files were classified in a directory structure, but in reality the contents files are not classified in a directory structure. In the tree display area, the heading "All music pieces" is not located at the lowest hierarchical level of the tree structure but partway up the structure, and in the event that "All music pieces" is selected, the contents are searched with an item corresponding to the parent thereof as the search key, and data relating to the corresponding contents is displayed in a list display area, so in a case described herein, contents matching the genre of "Blues" and artist name of "4 hero" are displayed on the list display area. Thus, desired contents files can be easily searched for.

5 Claims, 15 Drawing Sheets

INFORMATION PROCESSING APPARATUS AND INFORMATION PROCESSING METHOD, AND PROGRAM STORING MEDIUM

BACKGROUND OF THE INVENTION

1. Field of the Invention

The present invention relates to an information processing apparatus and information processing method, and program storing medium, and particularly relates to an information processing apparatus and information processing method, and program storing medium, wherein users can efficiently search out desired contents, based on attributes data recording in a manner correlated with saved contents.

2. Description of the Related Art

Various types of file s recorded by personal computers are arranged and saved by the user in a hierarchical structure. For example, in the event that Windows 98 (Registered Trademark) is being used as the operating system, the files are kept in a directory (i.e., in "folders"). Each folder can be named and classified. Creating folders inside folders allows the files to be managed hierarchically (nested).

For example, as shown in FIG. 1, in the event of organizing and recording music data in a folder "CONTENTS", the file tree structure can be confirmed using a shell program (a software module realizing a user interface provided to the user by the operating system for opening, copying, and deleting files, activating programs, and so forth).

The display window 1 of the shell program has two panes, one to the right and the other to the left, and of these the one to the left displays a tree display area 2 for displaying the directory tree, and the one to the right displays a list display area 3 for displaying a list of files or folders in a currently-selected directory.

In FIG. 1, four folders are contained in the folder "CONTENTS", namely, "BY ARTIST", "BY ALBUM", "FAVORITE MUSIC PIECES", and "BY GENRE". Each of the folders further contain folders or files. For example, the "BY GENRE" folder contains the four folders of "CLASSICAL", "JAZZ", "POPS, and "WESTERN MUSIC".

Further, as shown in FIG. 2, the folder "CLASSICAL" further can also contain many more folders. As shown in FIG. 3, the user can classify and manage a great number of contents files according to finely divided classification, by putting the contents files (e.g., "MUSIC PIECE A", "MUSIC PIECE B", "MUSIC PIECE C" shown in FIG. 3) hierarchically below the folders.

There are so-called jukebox applications for managing contents data downloaded from a WWW server or contents data read into a personal computer from a CD (Compact Disk) or the like, playing the contents, or writing the contents from the personal computer to other removable disks. FIG. 4 is a diagram illustrating an example of a display window displayed on the display of the personal computer in the event that the jukebox program has been activated. A great number of contents files can be classified and managed according to finely divided classification following the concept of the hierarchical structure described with reference to FIGS. 1 through 3, using such a jukebox as well.

For example, with the case shown in FIG. 4, the classification method and hierarchical structure used is as follows: "artist music piece (i.e., a contents file)"; "album→music piece"; "genre→music piece"; "artist album→music piece"; "genre→artist→music piece"; "genre→album→music piece"; "genre→artist→album→music piece", and so on. That is to say, the contents files are located at the lowest level of the hierarchical structure.

However, with jukeboxes and other such applications managing contents files using conventional tree structures, the contents files cannot be reached unless folders on the lowest level are opened, so the user cannot play contents data or move the contents data to other folders without tracking a complex hierarchical structure and find the folders containing the contents files the user desires. This problem is characterized in that making the classification more general in order to simplify the hierarchical structure results in a great number of contents files belonging to a single class, while making the classification finer results in a great number of entrances to the tree structure, so reaching the desire contents file becomes troublesome.

SUMMARY OF THE INVENTION

The present invention has been made in light of the above problem, and accordingly, it is an object thereof to enable users to efficiently search out desired contents, based on attributes data recording in a manner correlated with saved contents.

The information processing apparatus according to the present invention comprises: input means for receiving input of operations from a user; first recording means for recording a plurality of contents; second recording means for recording attributes data of the contents, corresponding to the contents recorded by the first recording means; first display means for displaying a plurality of first items indicating virtual classification of the contents with a hierarchical structure, based on the attributes data recorded by the second recording means; searching means for searching for the contents having attributes corresponding to the first item selected by the user from the plurality of first items displayed by the first display means, based on signals indicating operations of the user input by the input means; and second display means for displaying information relating to the contents searched by the searching means.

The first display means may display, for each hierarchical level for the virtual classification, a second item indicating all contents virtually classified into the hierarchical level; the searching means may further search the contents having attributes corresponding to at least one of the first items at a higher hierarchical level than the second item, in the event that signals indicating that the second item has been selected are input by the input means; and the second display means may further display information relating to the contents searched by the searching means.

The information processing apparatus may further comprise receiving means for receiving audio data from other information processing apparatuses via a network, wherein the contents include the audio data received by the receiving means, and may also comprise reading means for reading audio data from other information processing apparatuses, wherein the contents data includes the audio data read in by the reading means.

The information processing method according to the present invention comprises: an input step for receiving input of operations from a user; a first recording step for recording a plurality of contents; a second recording step for recording attributes data of the contents, corresponding to the contents recorded by the processing in the first recording step; a first display step for displaying a plurality of first items indicating virtual classification of the contents with a hierarchical structure, based on the attributes data recorded by the processing in the second recording step; a searching step for searching for the contents having attributes corresponding to the first item selected by the user from the plurality of first items displayed by the processing in the first display step, based on signals indicating operations of the user input by the processing in the input step; and a second display step for displaying information relating to the contents searched by the processing in the searching step.

The program stored in the program storing medium according to the present invention comprises: code for an input step for receiving input of operations from a user; code for a first recording step for recording a plurality of contents; code for a second recording step for recording attributes data of the contents, corresponding to the contents recorded by the processing in the first recording step; code for a first display step for displaying a plurality of first items indicating virtual classification of the contents with a hierarchical structure, based on the attributes data recorded by the processing in the second recording step; code for a searching step for searching for the contents having attributes corresponding to the first item selected by the user from the plurality of first items displayed by the processing in the first display step, based on signals indicating operations of the user input by the processing in the input step; and code for a second display step for displaying information relating to the contents searched by the processing in the searching step.

With the information processing apparatus, information processing method, and program stored in the program storing medium, according to the present invention, operations are input from a user, multiple contents are recorded, attributes data of the contents is recorded according to the recorded contents, multiple first items are displayed in a hierarchical structure indicating a virtual classification of contents based on the recorded attributes data, contents having attributes corresponding to the first item selected by the user of the multiple displayed first items are searched for based on signals indicating operations from the user, and information relating to the searched contents is displayed.

DESCRIPTION OF THE PREFERRED EMBODIMENTS

An embodiment of the present invention will be described with reference to the drawings.

Figure 1:
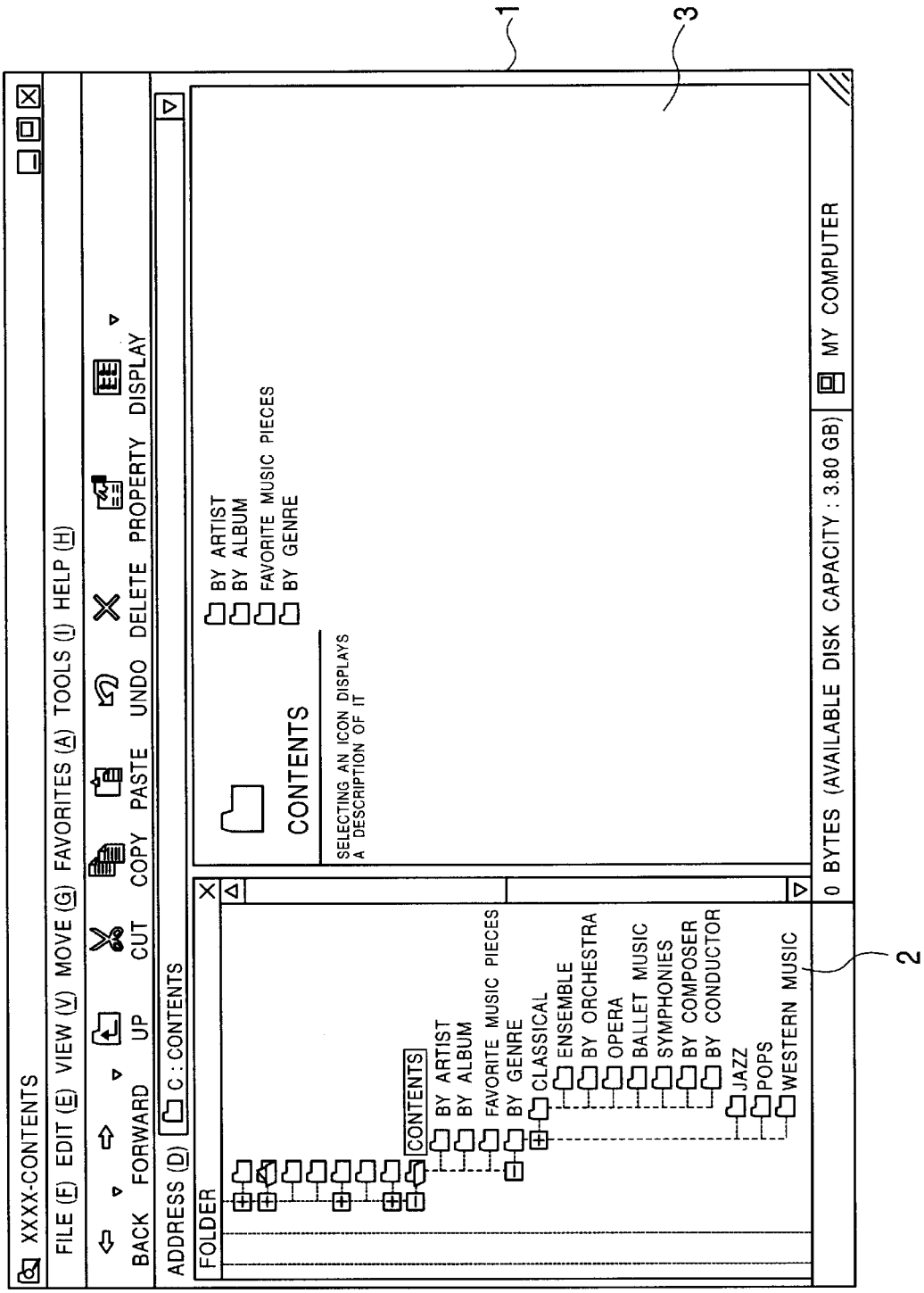
FIG. 1 is a diagram for describing a display screen in the event that a shell program used for file managing is activated.
Figure 2:
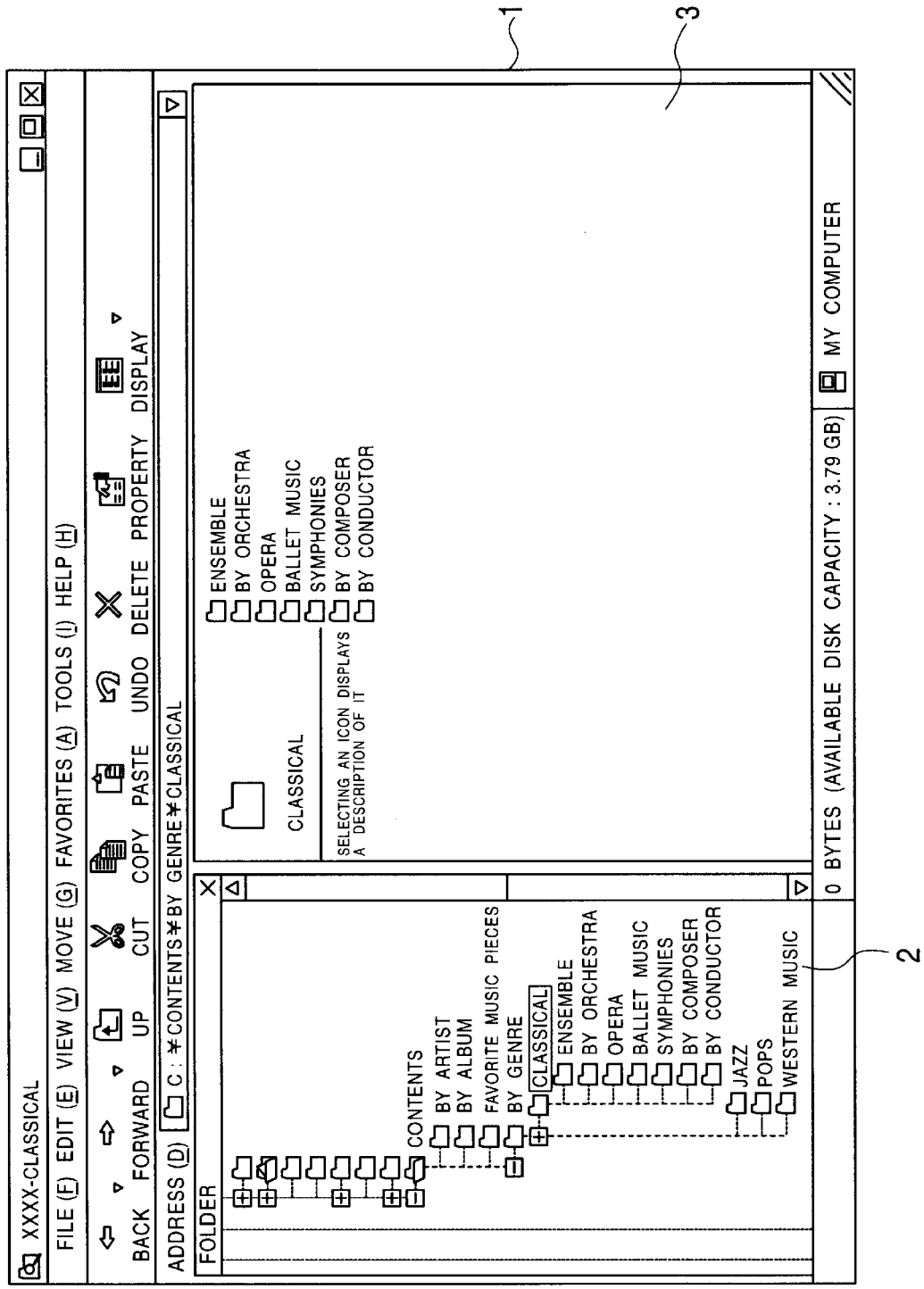
FIG. 2 is a diagram for describing a display screen in the event that a shell program used for file managing is activated.
Figure 3:
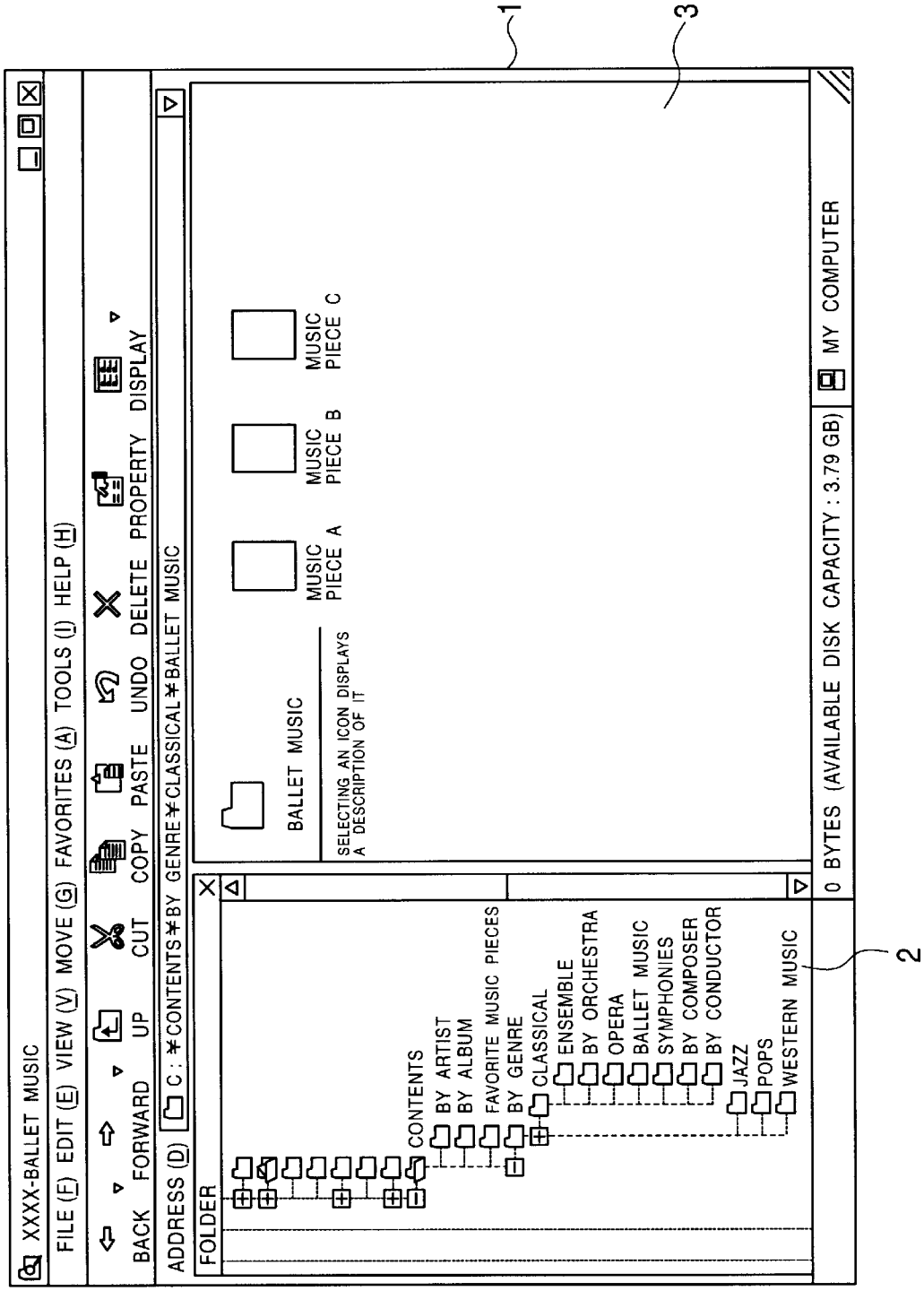
FIG. 3 is a diagram for describing a display screen in the event that a shell program used for file managing is activated.
Figure 4:
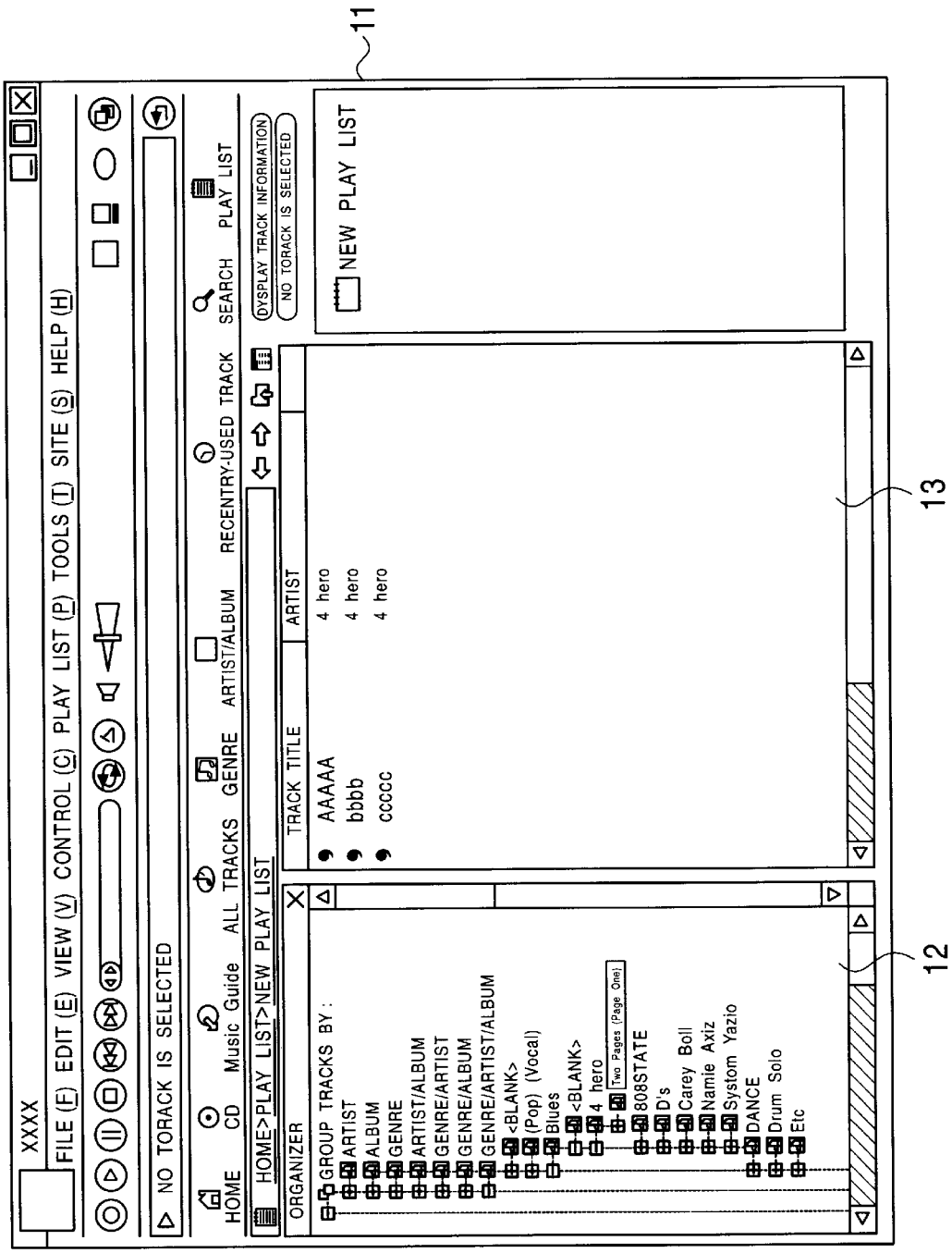
FIG. 4 is a diagram for describing file managing with a conventional jukebox application.
Figure 5:
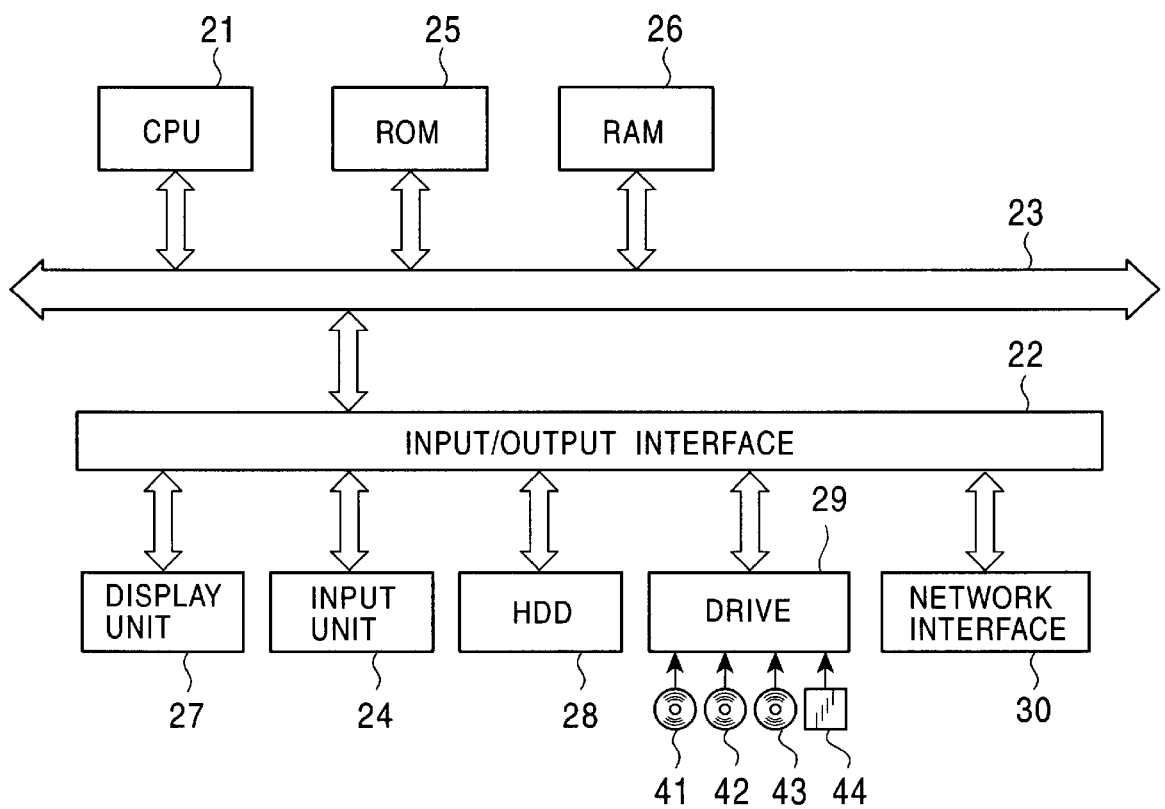
FIG. 5 is a block diagram illustrating the configuration of a personal computer.

FIG. 5 is a block diagram illustrating the configuration of the personal computer in which the jukebox application to which the present invention is applied has been installed.

A CPU (Central Processing Unit) 21 receives input of signals corresponding to various instructions which a user has input using an input unit 24 via an input/output interface 22 and internal bus 23, and input of control signals which other personal computers and the like have transmitted via a network interface 30, and executes various types of processing based on the input signals. ROM (Read-Only Memory) 25 generally stores, of the programs used by the CPU 21 and parameters used for computation, the fixed data. RAM (Random-Access Memory) 26 stores programs used for executing by the CPU 21 and parameters which change according to the execution thereof. The CPU 21, ROM 25, and RAM 26 are mutually connected by the internal bus 23.

The internal bus 23 is also connected to the input/output interface 22. The input unit 24 is made up of, for example, a keyboard and mouse, and is operated by the user when inputting various instructions to the CPU 21. The display unit 27 comprises, for example, a CRT (Cathode Ray Tube) or the like, for displaying various types of information in text and images.

A HDD (Hard Disk Drive) 28 drives hard disks, and records programs to be executed by the CPU 21 and information therein and reproduces the programs and information therefrom. Magnetic disks 41, optical disks 42, magneto-optical disks 43, and semiconductor memory 44, are mounted to a drive 29 as necessary, and data is exchanged.

The network interface 30 is connected to a WAN (Wide Area Network) such as the Internet, via an unshown telephone line for example, so as to receive input of contents data from music distribution download sites via the Internet, or so as to be connected to other personal computers or external storage devices via an unshown network cable and exchange information.

The input unit 24, ROM 25, RAM 26, display unit 27, HDD 28, drive 29, and network interface 30 are connected to the CPU 21 via the input/output interface 22 and the internal bus 23.

Figure 6:
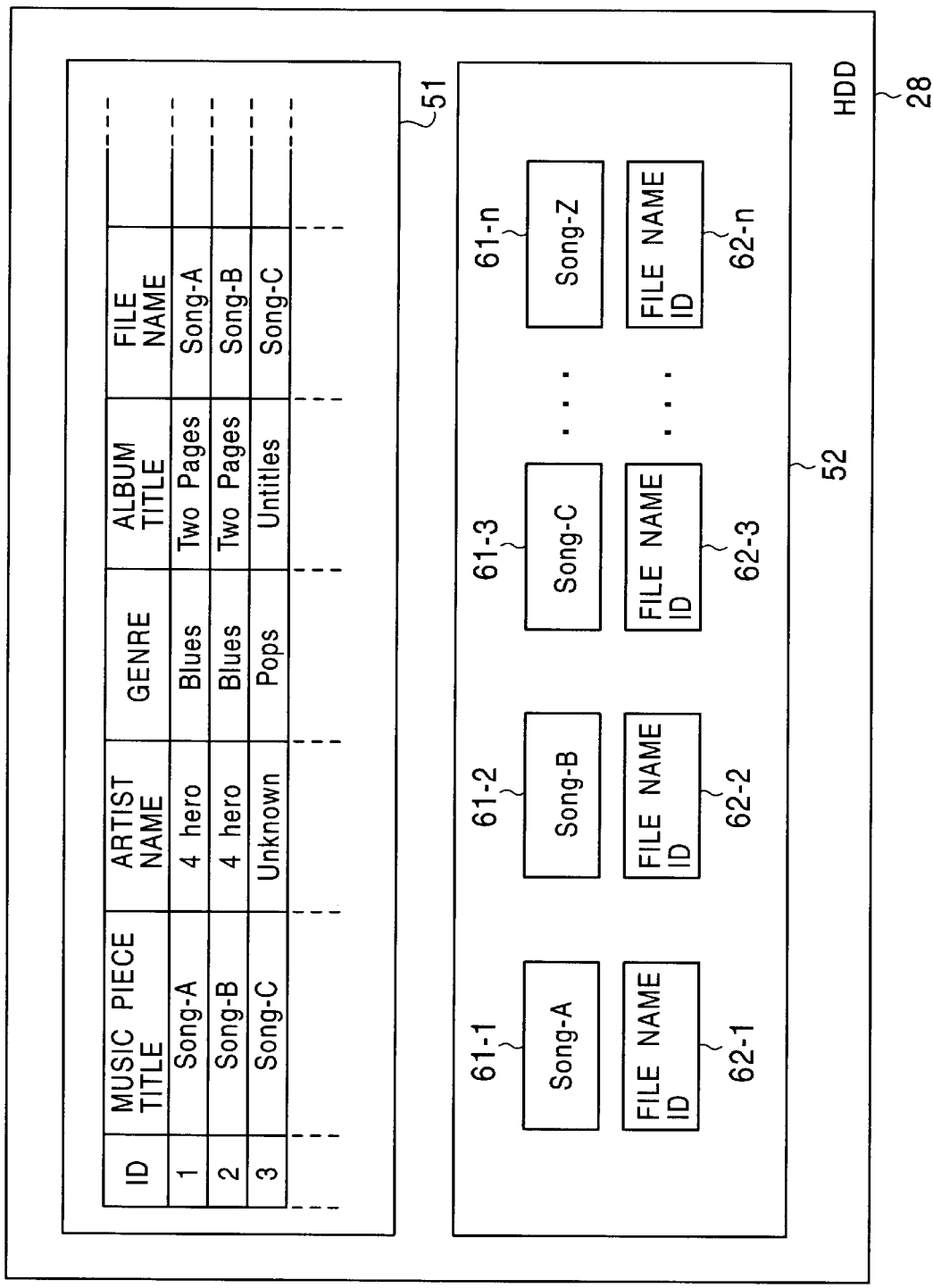
FIG. 6 is a diagram for describing a contents database and a contents file storing area.

Next, the contents data saved on the HDD 28 shown in FIG. 5 will be described with regard to a contents database for managing contents data, with reference to FIG. 6.

The contents data 61-1 through 61-n is stored in a contents file storing area 52 on the HDD 28 along with contents information 62-1 through 62-n wherein is described the corresponding file name and ID. All contents stored in the contents file storing area 52 are registered in the contents database 51.

Registered in the contents database 51 are IDs uniquely appropriated for each of the contents, and information indicating attributes of the contents. Examples of contents attributes include artist name, genre, album title, file name, and so forth.

The contents data registered in the contents database 51 is not restricted to the contents data saved in the contents file storing area 52 of the HDD 28, and may include contents data recorded in recording media such as a CD (Compact Disk) which is an optical disk 42 mounted to the drive 29, contents data stored in other personal computers or external storage devices connected via the network interface 30, and contents data recorded on removable disks mounted to various types of drive devices connected via the network interface 30. In this case, a path indicating the area where the contents data is stored is further registered in the contents database 51.

Figure 7:
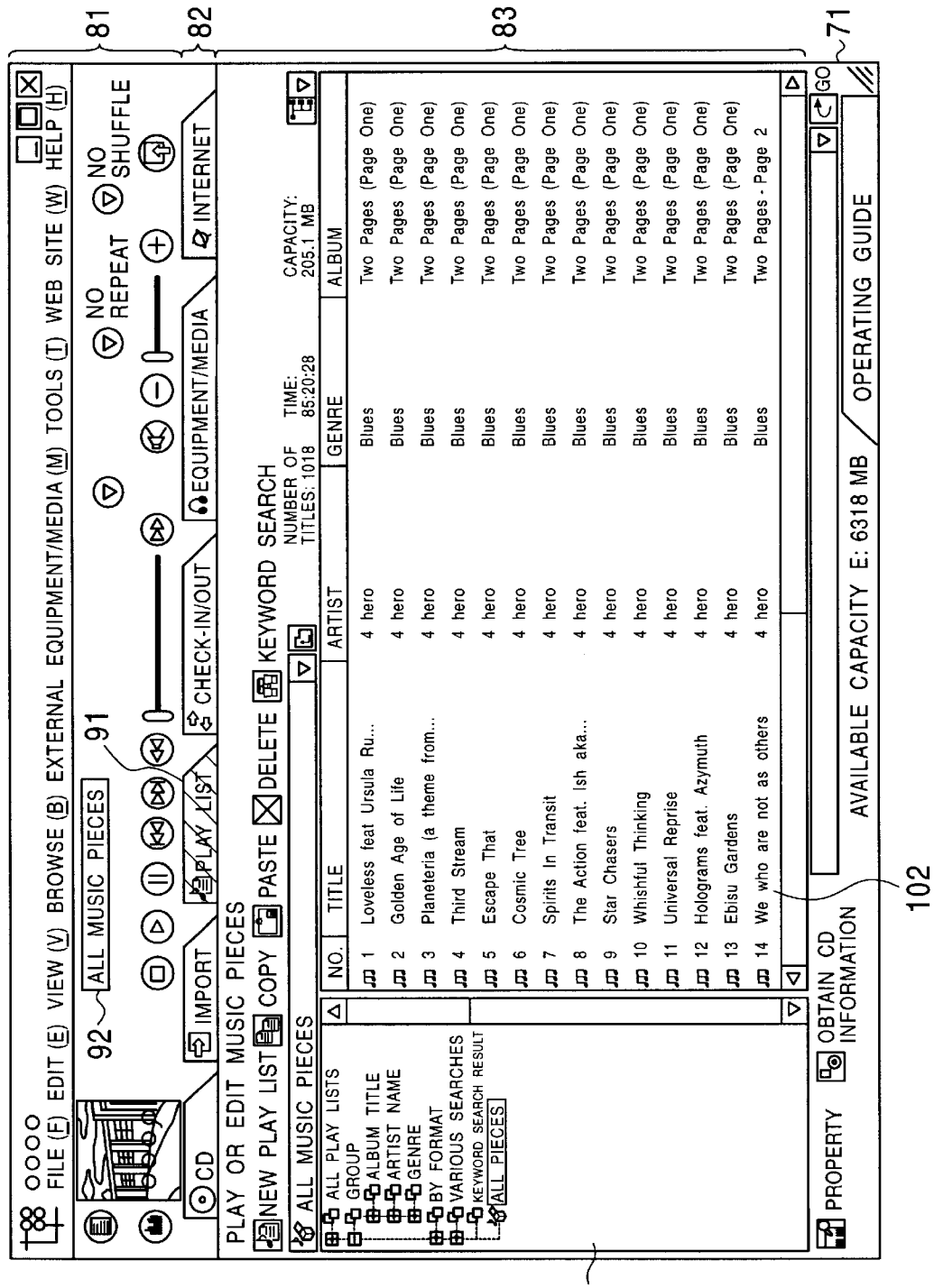
FIG. 7 is a diagram for describing a display screen of a jukebox application to which the present invention is applied.

Next, description will be made regarding a display window displayed on the display unit 27 in the event that the jukebox application program to which the present invention has been applied is loaded to the RAM 26 and activated, with reference to FIG. 7.

The player operating unit 81 of the display window 71 is made up of various types of operating buttons used for the user playing contents data imported to the jukebox application program. Also, the player operating unit 81 has a field 92 for displaying items selected in the tree display area 101 of the play list display area 83 in the event that the play list tab 91 is selected in the tab switch-over portion 82.

The tab switch-over portion 82 is configured of multiple tabs, and the user can perform desired operations by selecting one of the tabs. The play list tab 91 is selected in the event of playing contents data registered to the "play list" or collecting desired contents and editing a "favorites" contents data group and so forth. That is, the play list tab 91 is selected in the event of the user searching for desired contents.

The CD tab is selected in the event of performing operations to play contents data recorded on the CD that is mounted on the drive 29. The import tab is selected in the event of performing operations to register contents data that is recorded on the HDD 28 but not registered as contents data managed by the jukebox application program, to the "play list".

The check-in/check-out tab is selected in the event of performing operations for check-in or check-out of contents data between the "play list" and external equipment or recording media. The equipment/media tab is selected in the event of performing operations to play contents data recorded in external equipment or recording media. The Internet tab is selected in the event of performing operations to connect to the Internet and download desired contents.

The play list display area 83 displayed in the event that the user selects the play list tab 91 is made up of the tree display area 101 and list display area 102. Contents set by the user are displayed according to classification of a tree structure (hierarchical structure) in the tree display area 101, but the contents are not managed by directory according to the tree structure displayed in the tree display area 101; rather, the contents are recorded in the contents file storing area 52 as described with reference to FIG. 6, and the attributes thereof are registered in the contents database 51.

That is to say, the items displayed in the tree display area 101 are not so-called directory names, but indicate virtual tree structure made up of the names of the attributes registered in the contents database 51 and what is registered for each of the attributes.

Figure 8:
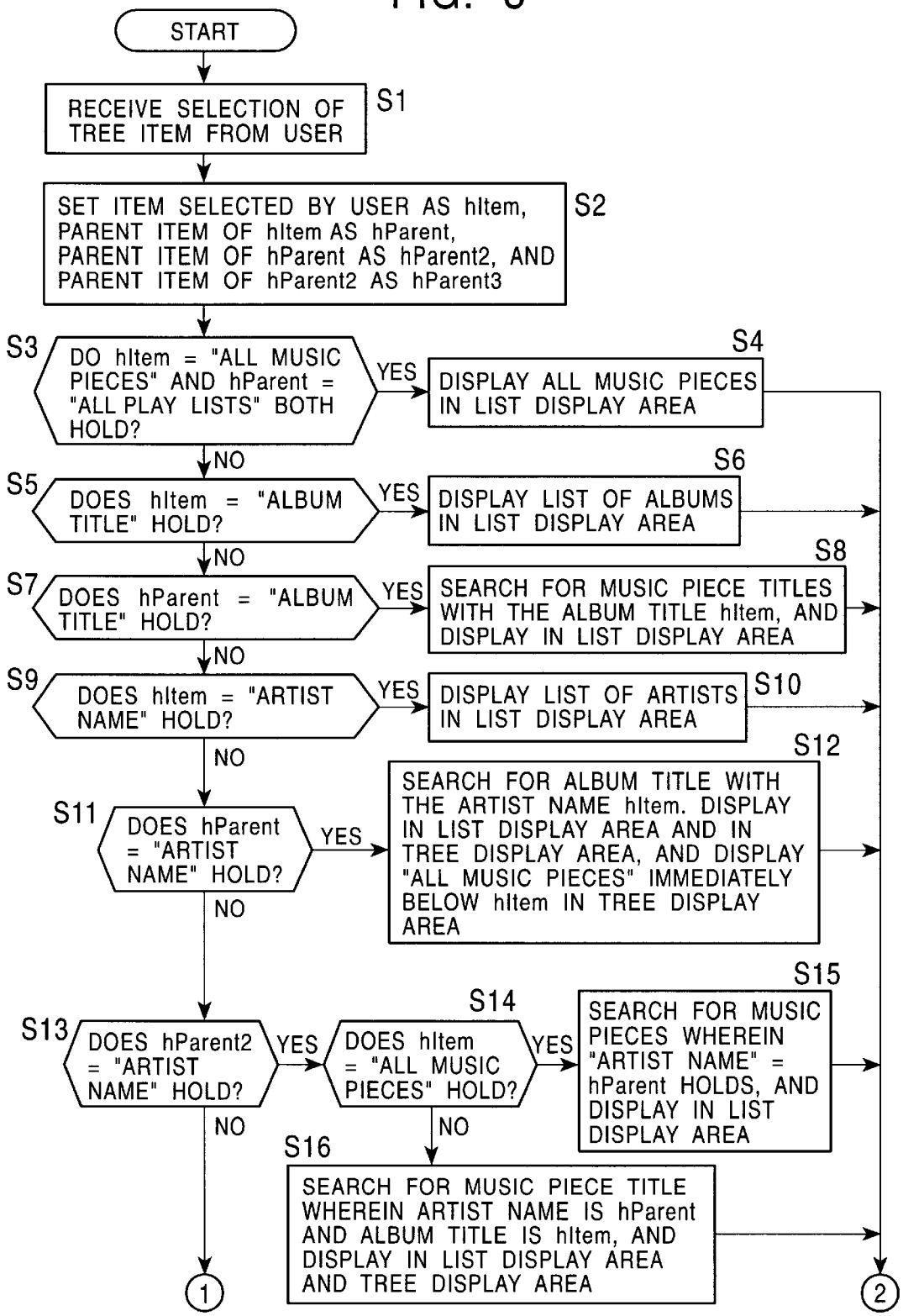
FIG. 8 is a flowchart for describing the contents display processing of the jukebox application.
Figure 9:
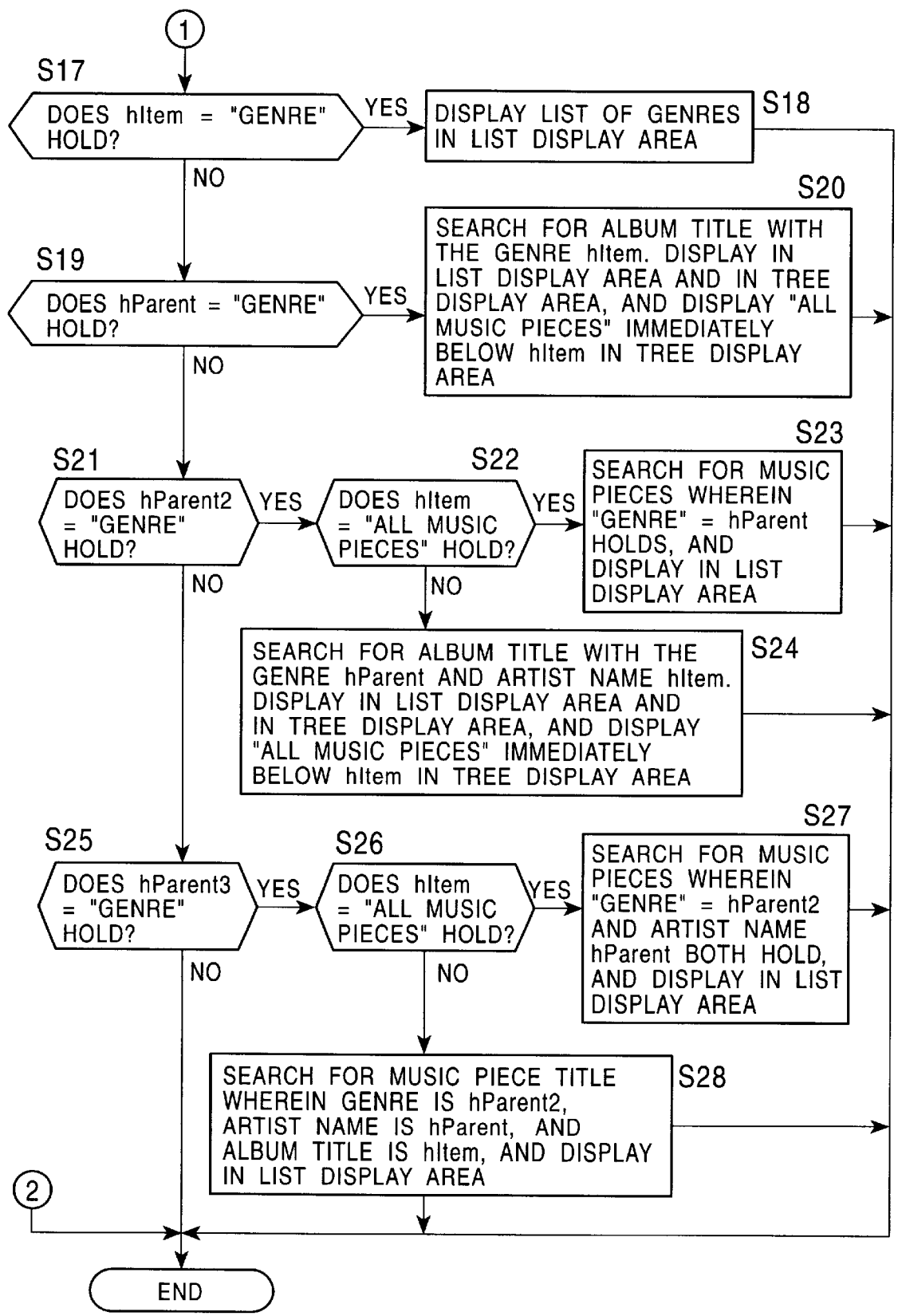
FIG. 9 is a flowchart for describing the contents display processing of the jukebox application.

The jukebox application program receives input of signals indicating the desired item which the user has selected using the input unit 24 from the items displayed in the list display area 102 or the tree display area 101, and changes the display thereof based on the processing described later with reference to FIGS. 8 and 9. The user can search for the desired contents data while making reference to the list display area 102 or the tree display area 101.

Next, with reference to the flowcharts in FIGS. 8 and 9, description will be made regarding the display processing of the list display area 102 and the tree display area 101 that is executed with regard to items selected by the user from the items displayed in the tree display area 101.

Now, of the items displayed in the tree display area 101 shown in FIG. 7, description will be made regarding a case wherein items displayed at a lower virtual hierarchical level of the items "ALL PLAY LISTS" and "GROUP" are selected, but the same processing is also executed for selection of the other items ("BY FORMAT" and "VARIOUS SEARCHES") and the items displayed at a lower virtual hierarchical level, so description thereof will be omitted.

In step S1, the jukebox application program receives selection of a tree item which the user has input using the input unit 24, and in step S2, sets the item selected by user as hItem, the parent item of hItem as hParent, the parent item of hParent as hParent2, and the parent item of hParent2 as hParent3.

In step S3, the jukebox application program judges whether or not hItem="ALL MUSIC PIECES" and hParent="ALL PLAY LISTS" both hold.

In the event that judgment is made in step S3 that hItem="ALL MUSIC PIECES" and hParent="ALL PLAY LISTS" both hold (i.e., the case in FIG. 7), in step S4 the jukebox application program displays all music piece titles registered in the play list in the list display area 102.

In the event that judgment is made in step S3 that hItem="ALL MUSIC PIECES" holds but hParent="ALL PLAY LISTS" does not hold, in step S5 the jukebox application program judges whether or not hItem="ALBUM TITLE" holds.

In the event that judgment is made in step S5 that hItem="ALBUM TITLE" holds, in step S6 the jukebox application program makes reference to "ALBUM TITLE" from the attributes of contents registered in the contents database 51, and displays a list of albums in the list display area 102.

In the event that judgment is made in step S5 that hItem="ALBUM TITLE" does not hold, in step S7 the jukebox application program judges whether or not hParent="ALBUM TITLE" holds.

Figure 10:
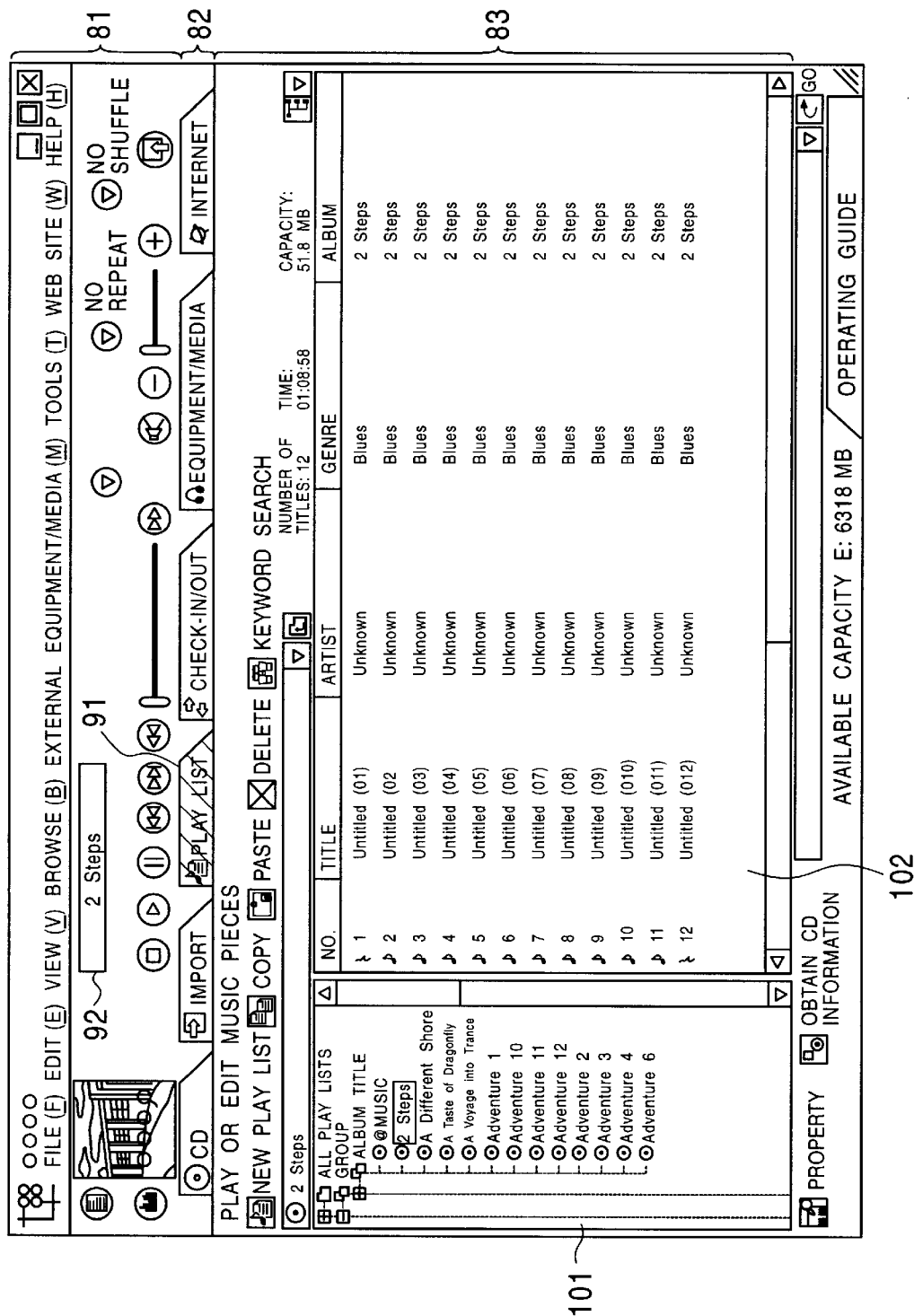
FIG. 10 is a diagram for describing display of selected items in a tree display area and a list display area.

In the event that judgment is made in step S7 that hParent="ALBUM TITLE" holds, in step S8 the jukebox application program searches for music piece titles of contents with attributes wherein the album title is hItem from the contents database 51, and displays these in the list display area 102. FIG. 10 shows the display window 71 displaying music piece titles of contents wherein the album title is hItem in the list display area 102.

In the event that hParent="ALBUM TITLE" holds as shown in FIG. 10, hItem is one of the album titles ("2 Steps" in this case), so the jukebox application program searches for the music piece titles of contents wherein the album title thereof is "2 Steps" from the contents database 51, and displays these in the list display area 102.

In the event that judgment is made in step S7 that hParent="ALBUM TITLE" does not hold, in step S9 the jukebox application program judges whether or not hItem="ARTIST NAME" holds.

In the event that judgment is made in step S9 that hItem="ARTIST NAME" holds, in step S10 the jukebox application program makes reference to "ARTIST NAME" from the attributes of contents registered in the contents database 51, and displays a list of artists in the list display area 102.

In the event that judgment is made in step S9 that hItem="ARTIST NAME" does not hold, in step S10 the jukebox application program judges whether or not hParent="ARTIST NAME" holds.

In the event that judgment is made in step S11 that hParent="ARTIST NAME" holds, in step S12 the jukebox application program searches the contents database 51 for album titles with contents attributes of the artist name of hItem, displays these in list display area 102 and in the tree display area 101, and displays "ALL MUSIC PIECES" immediately below hItem in the tree display area 101.

In the event that judgment is made in step S11 that hParent="ARTIST NAME" does not hold, in step S13 the jukebox application program judges whether or not hParent2="ARTIST NAME" holds.

In the event that judgment is made in step S13 that hParent2="ARTIST NAME" holds, in step S14 the jukebox application program judges whether or not hItem="ALL MUSIC PIECES" holds.

Figure 11:
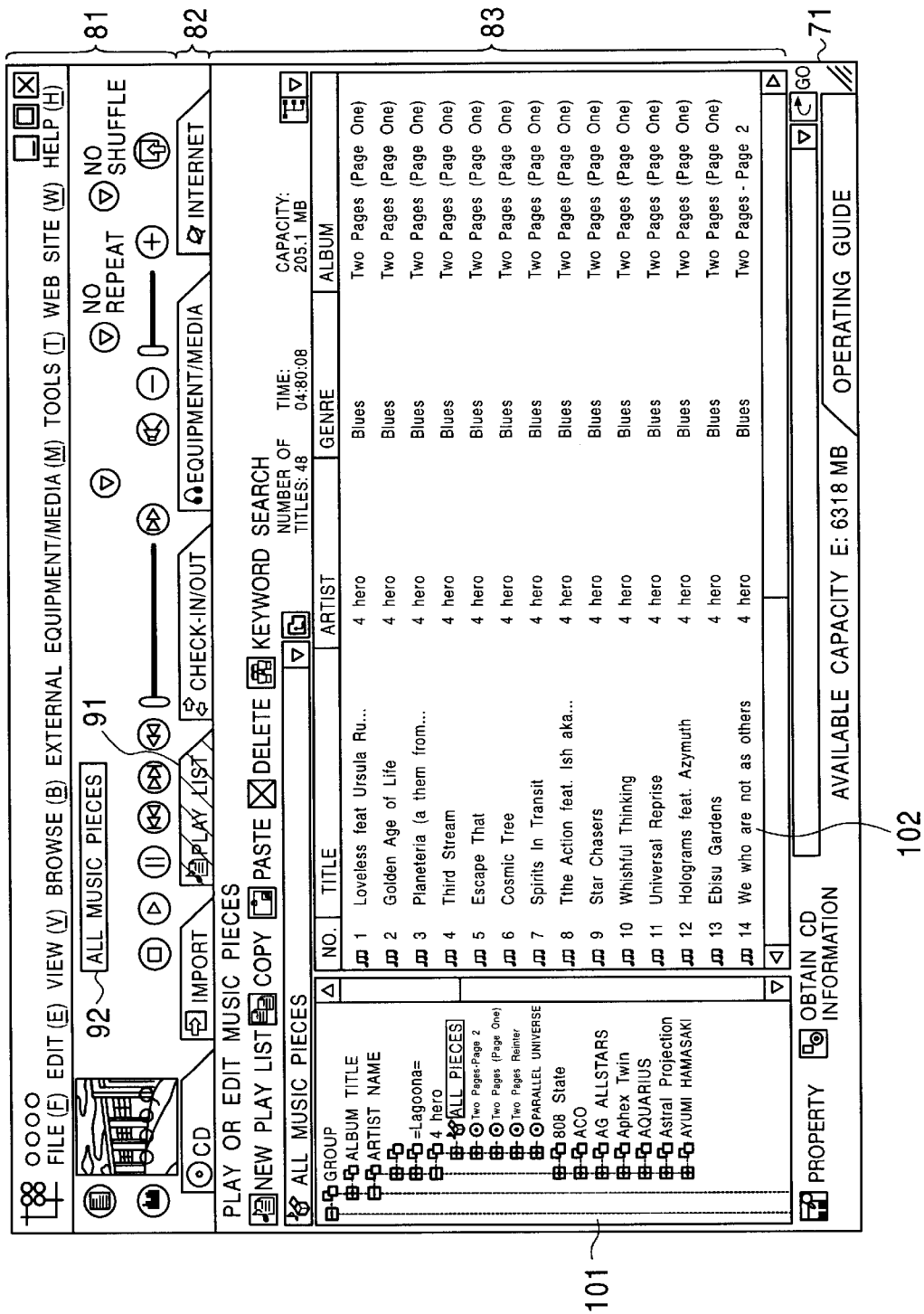
FIG. 11 is another diagram for describing display of selected items in the tree display area and the list display area.

In the event that judgment is made in step S14 that hItem "ALL MUSIC PIECES" holds, in step S15 the jukebox application program searches the contents database 51 for contents attributes of music piece titles of "ARTIST NAME"=hParent, and displays these in list display area 102. FIG. 11 shows the display window 71 displaying music piece titles of contents wherein the artist name is hParent in the list display area 102.

In the event that hParent2="ARTIST NAME" holds as shown in FIG. 11, hParent is one of the artist names ("4 hero" in this case), so the jukebox application program searches for the music piece titles of contents wherein the artist name thereof is "4 hero" from the contents database 51, and displays these in the list display area 102.

Figure 12:
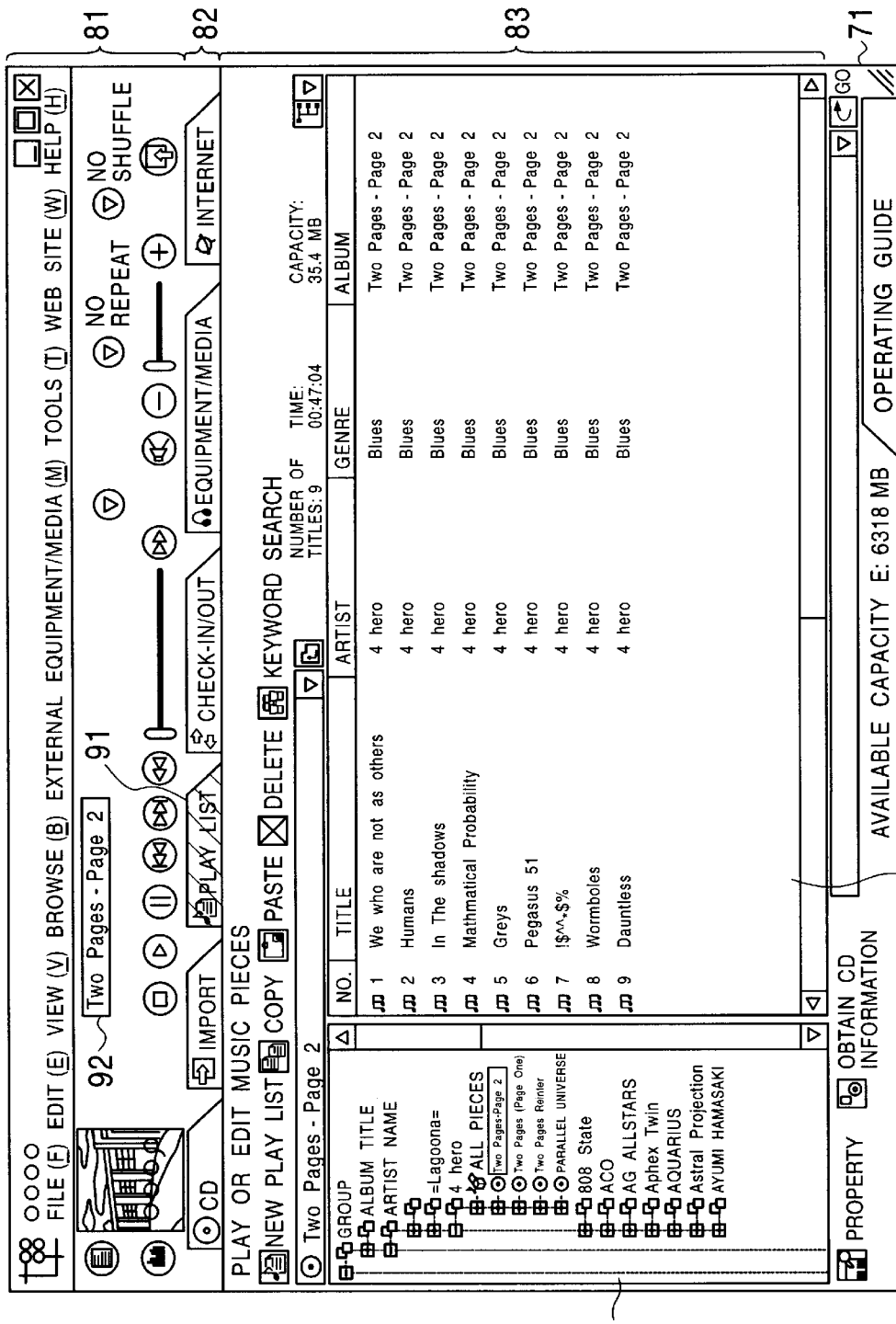
FIG. 12 is another diagram for describing display of selected items in the tree display area and the list display area.

In the event that judgment is made in step S14 that hItem="ALL MUSIC PIECES" does not hold, in step S16 the jukebox application program searches the contents database 51 for music piece titles of contents attributes of the artist name of hParent and the album title of hItem, and displays these in the list display area 102 and the tree display area 101. FIG. 12 shows the display window 71 displaying music piece titles of contents wherein the artist name is hParent and the album title is hItem in the list display area 102.

In the event that hParent2="ARTIST NAME" holds as shown in FIG. 12, hParent is one of the artist names ("4 hero" in this case), and in the event that hItem is not "ALL MUSIC PIECES", hItem is one of the album titles ("Two Pages-Page 2" in this case), so the jukebox application program searches for the music piece titles of contents wherein the artist name thereof is "4 hero" and the album title is "Two Pages-Page 2" from the contents database 51, and displays these in the list display area 102.

In the event that judgment is made in step S13 that hParent2="ARTIST NAME" does not hold, in step S17 the jukebox application program judges whether or not hItem="GENRE" holds.

In the event that judgment is made in step S17 that hItem="GENRE" holds, in step S18 the jukebox application program makes reference to "GENRE" from the attributes of contents registered in the contents database 51, and displays a list of genres in the list display area 102.

In the event that judgment is made in step S17 that hItem="GENRE" does not hold, in step S19 the jukebox application program judges whether or not hParent="GENRE" holds.

In the event that judgment is made in step S19 that hParent="GENRE" holds, in step S20 the jukebox application program searches for album titles with contents attributes of the genre hItem, displays these in list display area 102 and in the tree display area 101, and displays "ALL MUSIC PIECES" immediately below hItem in the tree display area 101.

In the event that judgment is made in step S19 that hParent="GENRE" does not hold, in step S21 the jukebox application program judges whether or not hParent2="GENRE" holds.

In the event that judgment is made in step S21 that hParent2="GENRE" holds, in step S22 the jukebox application program judges whether or not hItem="ALL MUSIC PIECES" holds.

Figure 13:
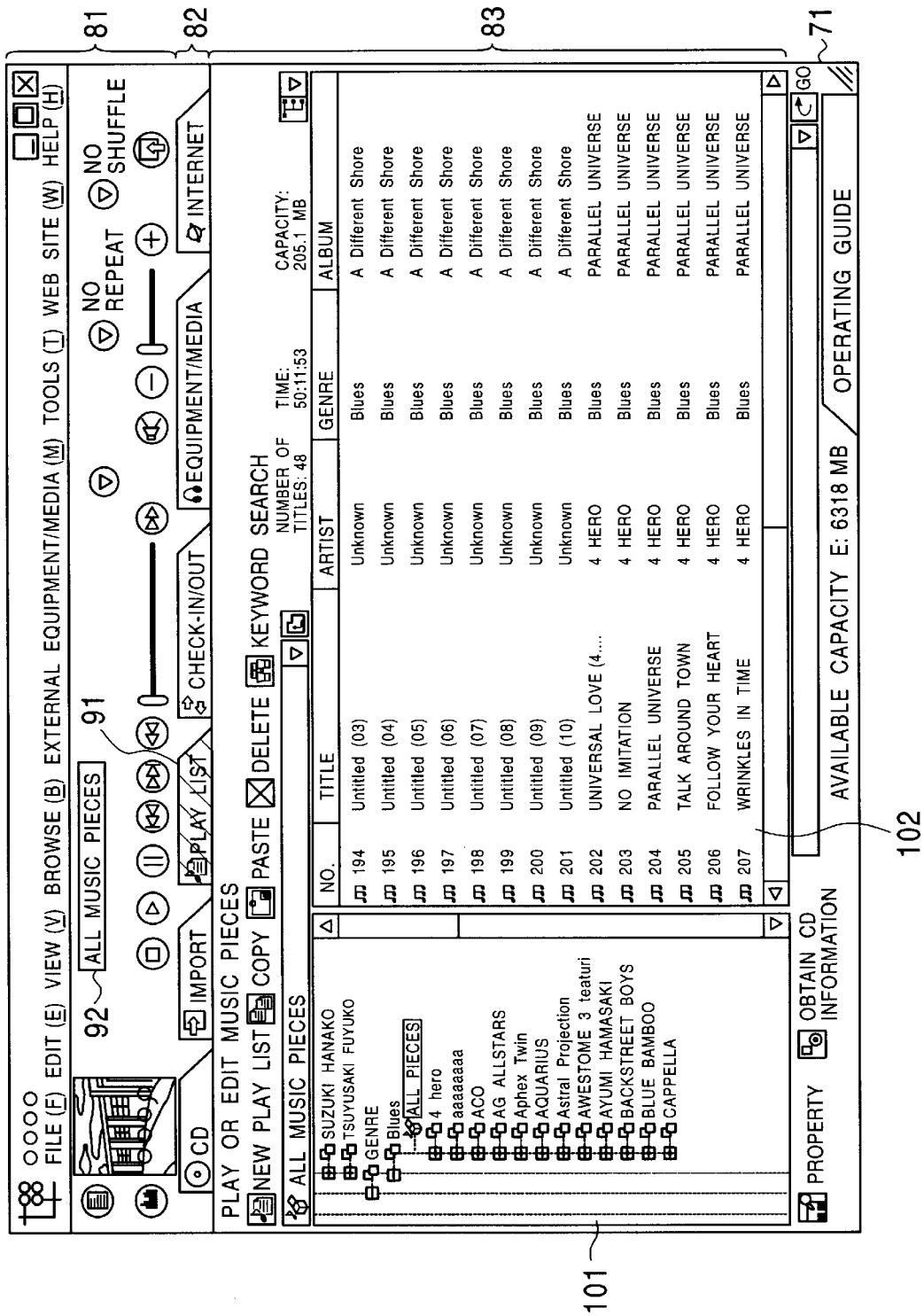
FIG. 13 is another diagram for describing display of selected items in the tree display area and the list display area.

In the event that judgment is made in step S22 that hItem="ALL MUSIC PIECES" holds, in step S23 the jukebox application program searches the contents database 51 for contents with music piece titles wherein "GENRE"=hParent holds for the contents attributes, and displays these in the list display area 102. FIG. 13 shows the display window 71 displaying music piece titles of contents wherein the genre is hParent in the list display area 102 in step S23.

In the event that hParent2="GENRE" holds as shown in FIG. 13, hParent is one of the genres ("Blues" in this case), so the jukebox application program searches for the music piece titles wherein the genre thereof is "Blues" from the contents database 51, and displays these in the list display area 102.

In the event that judgment is made in step S22 that hItem="ALL MUSIC PIECES" does not hold, hItem is one of the artist names, so in step S24 the jukebox application program searches the contents database 51 for album titles with the genre hParent and artist name hItem as contents attributes, displays these in list display area 102 and in the tree display area 101, and displays "ALL MUSIC PIECES" immediately below hItem in the tree display area 101.

In the event that judgment is made in step S21 that hParent2="GENRE" does not hold, in step S25 the jukebox application program judges whether or not hParent3="GENRE" holds.

In the event that judgment is made in step S25 that hParent3="GENRE" holds, in step S26 the jukebox application program judges whether or not hItem="All MUSIC PIECES" holds.

Figure 14:
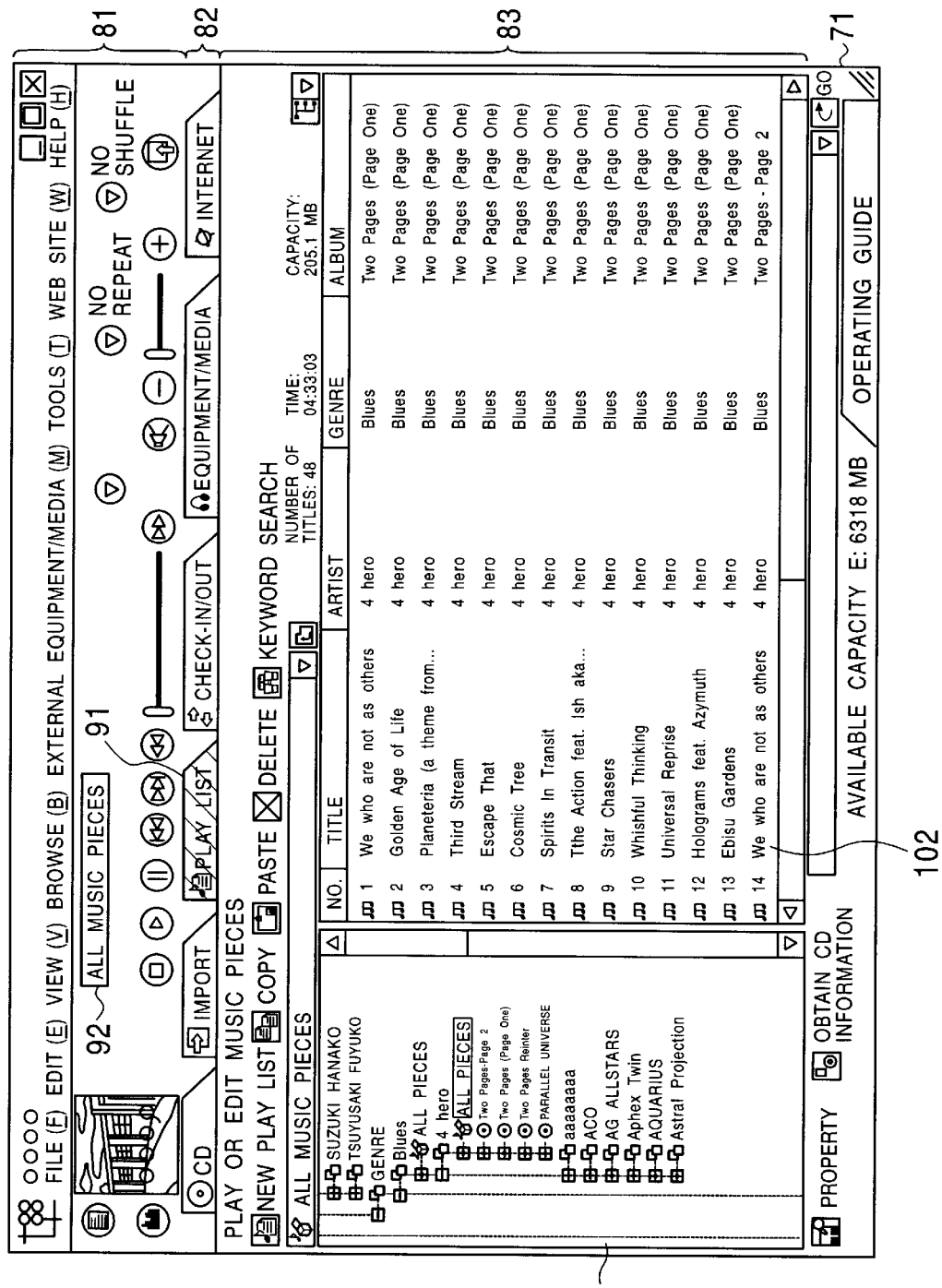
FIG. 14 is another diagram for describing display of selected items in the tree display area and the list display area.

In the event that judgment is made in step S26 that hItem="ALL MUSIC PIECES" holds, in step S27 the jukebox application program searches the contents database 51 for music piece titles wherein "GENRE"=hParent2 and also "ARTIST NAME"=hParent hold for the contents attributes, and displays these in the list display area 102. FIG. 14 shows the display window 71 displaying music piece titles of contents wherein the genre is hParent2 and the artist name is hParent in the list display area 102.

In the event that hParent3="GENRE" holds as shown in FIG. 14, hParent2 is one of the genres ("Blues" in this case), and hParent is one of the artist names ("4 Hero" in this case) so the jukebox application program searches for the contents with music piece titles wherein the genre thereof is "Blues" and the artist name is "14 Hero" from the contents database 51, and displays these in the list display area 102.

Figure 15:
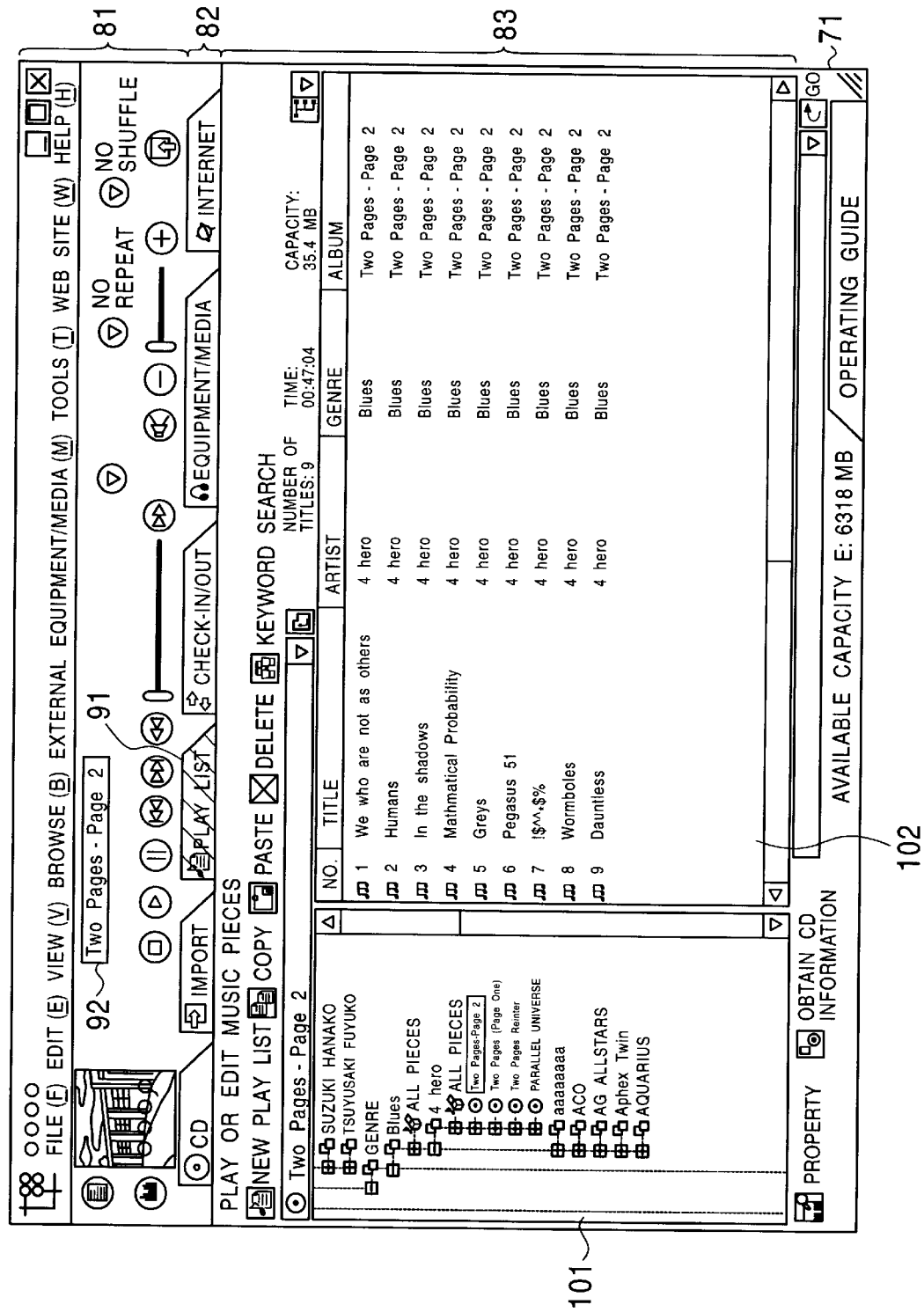
FIG. 15 is another diagram for describing display of selected items in the tree display area and the list display area.

In the event that judgment is made in step S26 that hItem="ALL MUSIC PIECES" does not hold, in step S28 the jukebox application program searches the contents database 51 for music piece titles with the genre hParent2 and artist name hParent and album title hItem as contents attributes, and displays these in list display area 102. FIG. 15 shows the display window 71 displaying music piece titles of contents wherein the genre is hParent2 and the artist name is hParent and the album title is hItem in the list display area 102.

In the event that hParent3="GENRE" holds as shown in FIG. 15, hParent2 is one of the genres ("Blues" in this case), hParent is one of the artist names ("4 Hero", in this case), and in the event that hItem="ALL MUSIC PIECES" does not hold, hItem is one of the album titles ("Two Pages Page 2" in this case) so the jukebox application program searches for contents with music piece titles wherein the genre thereof is "Blues" and the artist name is "4 Hero" and the album title is "Two Pages-Page 2" from the contents database 51, displays these in the list display area 102, and the processing ends.

That is to say, with the jukebox application program to which the present invention has been applied, a display is made in the tree display area 101 of the play list display area 83 as if each of the contents files were classified according to a directory structure, but in reality, the contents files are not classified and recorded in a directory. In the tree display area 101, "ALL MUSIC PIECES" is also display at a partway position in the tree, and in the event that "ALL MUSIC PIECES" is selected, the contents are searched with the item corresponding to the parent thereof as the search key, and data relating to the corresponding contents is displayed in the list display area 102.

This arrangement not only facilitates the searching task in the event of searching for desired contents since the initial options are few in operating the tree, but also the desired contents can be efficiently found even in the event that a great number of pieces of contents data are saved, by selecting "ALL MUSIC PIECES" at the point that the user judges that the classification of the contents data has been narrowed down sufficiently.

Note that while the description here has been made regarding file managing and searching processing with an application called a jukebox, for managing contents data downloaded from a WWW server or contents data read into a personal computer from a CD, playing the contents, or writing the contents from the personal computer to other removable disks, the present invention is by no means restricted to jukebox applications; the present invention is also applicable to file managing with other applications, and to so-called shell programs for managing files.

The above-described series of processes can be executed by software as well. In the event of executing the series of processes by software, the program making up the software is provided in dedicated hardware which is assembled into a computer, or is installed to, for example, a general-purpose personal computer, capable of executing various functions by installing various types of programs, from a recording medium.

This storing medium, as shown in FIG. 5, comprises packaged media to be distributed to the user separately from the computer in order to provide the program thereto, such as magnetic disks 41 (including floppy disks), optical disks 42 (including CD-ROMs (Compact Disk Read-Only Memory) and DVDs (Digital Versatile Disks)), magneto-optical disks 43 (including MDs (Mini-Disks)), or semiconductor memory 44 or the like, with the program recorded therein.

In the present specification, the steps describing the programs stored in the storing medium may of course be executed in the time sequence following the order in which they are listed, but are not restricted to being executed in this time sequence, and may be executed in parallel or individually.

With the information processing apparatus, information processing method, and the program stored in the program storing medium, according to the present invention, operations are input from a user, multiple contents are recorded, attributes data of the contents is recorded according to the recorded contents, multiple first items are displayed in a hierarchical structure indicating a virtual classification of contents based on the recorded attributes data, contents having attributes corresponding to the first item selected by the user of the multiple displayed first items are searched for based on signals indicating operations from the user, and information relating to the searched contents. Accordingly, the user can efficiently find desired contents, based on attributes data recorded in a manner correlated to the saved contents.

What is claimed is:

1. An information processing apparatus, comprising:
  input means for receiving input of operations from a user;
  first recording means for recording a plurality of contents;
  second recording means for recording attributes data of said contents, corresponding to said contents recorded by said first recording means;
  first display means for displaying a plurality of first items indicating virtual classification of said contents with a hierarchical structure, based on said attributes data recorded by said second recording means, and for displaying a second item for each hierarchical level for said virtual classification, said second item indicating all contents virtually classified into said hierarchical level;
  searching means for searching for said contents having attributes corresponding to said first item selected by said user from said plurality of first items displayed by said first display means, based on signals indicating operations of said user input by said input means, and for searching said contents having attributes corresponding to at least one of said first items at a higher hierarchical level than said second item, in the event that signals indicating that said second item has been selected are input by said input means; and
  second display means for displaying information relating to said contents searched by said searching means.

2. An information processing apparatus according to claim 1, further comprising receiving means for receiving audio data from other information processing apparatuses via a network;

wherein said contents include said audio data received by said receiving means.

3. An information processing apparatus according to claim 1, further comprising reading means for reading audio data from other information processing apparatuses;

wherein said contents data includes said audio data read in by said reading means.

4. An information processing method, comprising:

an input step for receiving input of operations from a user;

a first recording step for recording a plurality of contents;

a second recording step for recording attributes data of said contents, corresponding to said contents recorded by the processing in said first recording step;

a first display step for displaying a plurality of first items indicating virtual classification of said contents with a hierarchical structure, based on said attributes data recorded by the processing in said second recording step, and for displaying a second item for each hierarchical level for said virtual classification, said second item indicating all contents virtually classified into said hierarchical level;

a searching step for searching for said contents having attributes corresponding to said first item selected by said user from said plurality of first items displayed by the processing in said first display step, based on signals indicating operations of said user input by the processing in said input step, and for searching said contents having attributes corresponding to at least one of said first items at a higher hierarchical level than said second item, in the event that signals indicating that said second item has been selected are input by said input means; and a second display step for displaying information relating to said contents searched by the processing in said searching step.

5. A program storing medium storing a computer-readable program, said program comprising:

code for an input step for receiving input of operations from a user;

code for a first recording step for recording a plurality of contents;

code for a second recording step for recording attributes data of said contents, corresponding to said contents recorded by the processing in said first recording step;

code for a first display step for displaying a plurality of first items indicating virtual classification of said contents with a hierarchical structure, based on said attributes data recorded by the processing in said second recording step, and for displaying a second item for each hierarchical level for said virtual classification, said second item indicating all contents virtually classified into said hierarchical level;

code for a searching step for searching for said contents having attributes corresponding to said first item selected by said user from said plurality of first items displayed by the processing in said first display step, based on signals indicating operations of said user input by the processing in said input step, and for searching said contents having attributes corresponding to at least one of said first items at a higher hierarchical level than said second item, in the event that signals indicating that said second item has been selected are input by said input means; and code for a second display step for displaying information relating to said contents searched by the processing in said searching step.

* * * * *